B. L. LAWTON.
SHOCK ABSORBER ADJUSTMENT.
APPLICATION FILED JAN. 4, 1912.
1,022,145.
Patented Apr. 2, 1912.
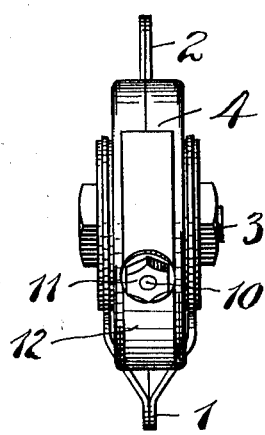
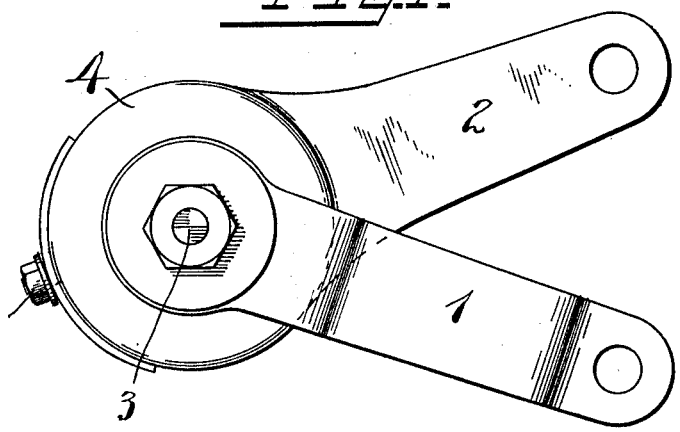
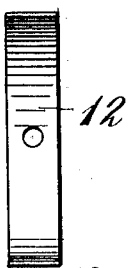
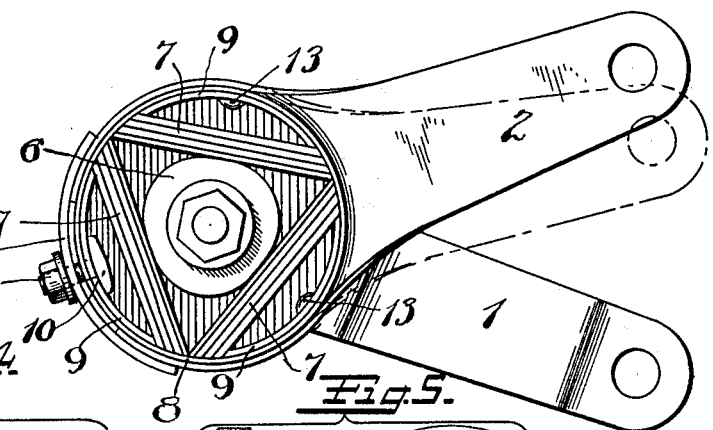
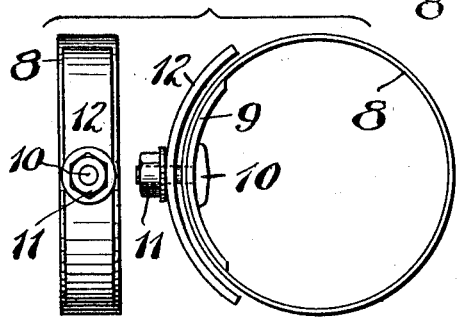
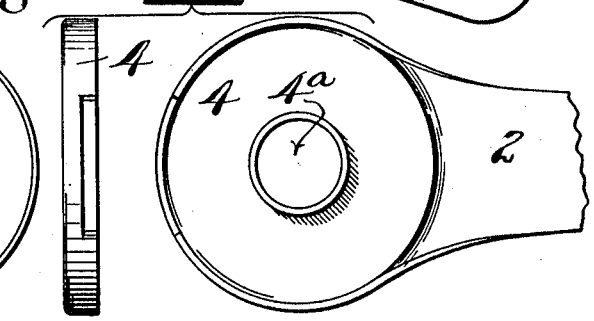
Witnesses:
Inventor
B. L. LAWTON
By his Attorneys

UNITED STATES PATENT OFFICE.

BURTON L. LAWTON, OF MERIDEN, CONNECTICUT, ASSIGNOR TO THE CONNECTICUT SHOCK ABSORBER COMPANY, OF MERIDEN, CONNECTICUT, A CORPORATION OF CONNECTICUT.

SHOCK-ABSORBER ADJUSTMENT.

1,022,145.     Specification of Letters Patent.     Patented Apr. 2, 1912.

Application filed January 4, 1912. Serial No. 669,452.

*To all whom it may concern:*

Be it known that I, BURTON L. LAWTON, a citizen of the United States, residing at Meriden, New Haven county, State of Connecticut, have invented certain new and useful Improvements in Shock-Absorber Adjustments, of which the following is a full, clear, and exact description.

My invention relates to shock absorbers of the non-friction spring resistance type, in which a cam and a spring are arranged in coöperative relation and operated, one relatively to the other, by the up and down movement of the vehicle to which the shock absorber is applied, the power required to flex the spring by the cam being employed to check the abnormal movement of the vehicle body relatively to the axle thereof. It will be seen that the apparatus operates as supplemental to the usual vehicle springs. One specimen of such a shock absorber is found in United States Letters Patent No. 982,914, granted on January 31st, 1911, to Wilcox and Cuno, in which patent one form of adjusting device is provided to adapt the shock absorber to vehicles of varying clearance between the body portion thereof and the axle.

The object of the present invention is to provide an exceedingly simple adjusting mechanism whereby the parts are adjusted to the proper position as a mere incident to the act of applying the shock absorber to the vehicle, instead of involving a more difficult operation, for example, an adjustment which involves the removal of the absorber from the vehicle.

In the drawings, Figure 1 is a side elevation of the main parts of the shock absorber. Fig. 2 is a rear end elevation thereof. Fig. 3 is a side elevation with a certain part removed to show the internal arrangement. Fig. 4 illustrates a rear end and side elevation of certain details. Fig. 5 illustrates a rear end and side elevation of another detail. Fig. 6 represents the inner side of a detail.

1—2 are coöperating lever elements or arms designed to be connected at their free ends, in any suitable manner, to the vehicle with which the apparatus is to be used. For example, the arm 1 may be connected to the axle of the vehicle, while the arm 2 may be connected to the vehicle body, which parts, namely, the vehicle axle and body, are connected by suitable load bearing springs. The arms 1—2 partake of a hinge movement on the axis of a center bolt 3. The arm 2 is provided with a circular box-like extension 4, which forms an inclosed chamber in which the shock absorbing mechanism is located.

In the preferred form shown in the drawings, the arm 2 may be made of sheet metal, and may comprise two companion parts, the box-like extension being formed partly on one and partly on the other, so that when said two parts are placed together (as shown in the drawings) a box or housing will thereby be formed. The lever arm 1 may likewise be composed of two companion parts arranged to straddle the box 4, and to be secured to the ends of a cam 6 located centrally within the box 4, the cam ends projecting therethrough and being suitably formed to rigidly receive the ends of the arm 1, so that as the arm 1 moves it will turn said cam. In this particular instance, the cam 6 has three high parts spaced at equal distances. Resting upon the low parts of the cam 6 are springs 7—7—7 arranged in triangular form. The springs may be formed of a plurality of spring blades, the blade located adjacent to the cam being preferably made of material which will effectively withstand wear and eliminate friction.

8 is a ring arranged around the springs 7—7—7 and designed to carry the same. To prevent slippage of the springs within the ring 8, I provide suitable shoulders. In this instance the shoulders are formed by segmental plates 9—9—9, which may be riveted, or otherwise fastened, within the ring 8, so that the ends of the springs will be properly supported against rotary displacement in the ring or carrier 8. In the edge of the box or housing 4, preferably at the rear, is a slot.

10 is a bolt which projects outwardly from the ring 8, being suitably secured thereto, and extends through the slot to the outside of the housing 4.

11 is a clamping nut at the outer end of the bolt 10.

12 is a plate controlled by the bolt 10 and shaped to the outer side of the box, and of a suitable size to cover the slot through which the bolt passes. The ring 8 is fitted neatly within the box 4 and yet may turn therein when the clamping bolt 10 is free.

In practice the proper adjustment for the various parts of the shock absorber should be such that when the shock absorber is applied to the vehicle (preferably with its normal load therein and said vehicle is standing still), the said springs 7—7 will rest upon the cam 6 upon the low parts of the cam. It will at once be seen that if the nut 11 is slacked off, there will be no positive connection between the ring 8 and the box 4. Hence, in applying the shock absorber to a vehicle, the nut 11 is first slacked off and the arms 1—2 are then connected to the vehicle body and axle, suitable pivotal brackets (not shown but well understood) being provided. As the arms 1—2 are moved apart more or less to effect this application of the side arms to the vehicle, it is obvious that the spring carrier 8 will turn with the cam, since the cam, bearing against the springs 7—7, will fully turn the springs, together with the ring 8, bodily in the box or housing 4. When the absorber has been thus attached to a vehicle, the nut 11 is clamped, causing the plate 12 to hug tightly against the periphery of the box 4, thereby securing the ring 8 and the springs in a definite fixed relation relatively to said box 4, and hence relatively to the arm 2. When the parts are thus adjusted, if the ends of the arms 1—2 are moved toward or away from each other, it follows that the spring 7 will be flexed, thereby checking any abnormal downward and upward movement of the vehicle body relatively to the axle. In practice it is customary to fill the entire space within the box 4 with grease, or other suitable lubricant, to avoid friction and wear, thereby giving to the appliance long life, and avoiding the necessity for the use of any take-up devices to compensate for wear, which is a necessary and common incident to all shock absorbing devices which rely upon friction, in any measure, as the medium of resistance.

It will be seen that the bolt 3 performs merely the function of a center bolt to hold all of the parts together, and that the same does not take any wear or strain in use, the only working surfaces in use being the anti-friction surfaces of the cam 6 and the spring or springs 7. In the drawings I have shown the clamping bolt 10 as piercing both the ring 8 and one of the segmental plates within the same, whereby said bolt constitutes at once a fastening to prevent the sliding movement of the segmental plate 9 through which it passes within the ring 8. The other segmental plates shown may be fastened against sliding movement in the ring 8 in any desired manner, but preferably by rivets 13. By preference the clamping surface of the combined clamping and slot covering plate 12 is somewhat roughened or knurled, as shown in Fig. 6, to guarantee against slippage, thereby relieving strain on the bolt 10.

I have purposely refrained from showing or describing unnecessary details of construction, such as the fittings for the free ends of the arms 1—2 by which the same are properly connected to the vehicle.

While I have shown the invention in its preferred form, it is obvious that various modifications may be resorted to without departing from the spirit or scope of the invention. It should perhaps be stated that the hub ends of the cam 6 are of sufficient overall length to project slightly outside of the box 4, so that when the bolt 3 is tightened up to clamp the ends of the arm 1 against the cam, it will not cause any binding action between the exterior wall of the case 4 and the arms, said parts being placed only close enough together to exclude dirt. The hub ends of the cam 6 pass freely through perforations in the center side walls of the box 4, one of said perforations being shown at 4$^a$, Fig. 5. All of the parts thus described may be so neatly fitted and combined that not only is dust excluded, but the grease, desirable for the effective and durable operation of the parts, will be retained within the area of the box occupied by the cam and springs.

What I claim is:

1. In a shock absorbing apparatus for vehicles, two arms pivotally connected, a cam carried by one of said arms, a spring resting against said cam, a holder for said spring, in combination with a housing inclosing said parts carried by the other arm, said spring holder being shiftable in said housing, and means for locking said spring holder within said housing.

2. In a shock absorbing apparatus for vehicles, two arms, a housing carried by one arm, a cam within said housing and secured to the other arm, a spring within said housing resting against the cam, a spring carrier for said spring adjustable within said housing whereby the position of the spring within said housing may be varied, and means to secure said spring within said housing in a fixed relation thereto after adjustment.

3. In a shock absorbing apparatus for vehicles, two arms, a housing carried by one of said arms, a cam within said housing and connected to the other arm, said cam having a plurality of high parts with intermediate low parts, a plurality of springs within said housing normally resting against the low parts of said cam, a spring carrier for said springs adjustable within said housing, and means for locking said spring carrier at various positions of adjustment.

4. In a shock absorbing apparatus for vehicles, two arms, a housing carried by one arm, a cam within said housing secured to the other arm, said cam having a plurality of high parts and intermediate low parts, a plurality of springs normally resting against the low parts of said cam, a ring-like spring carrier fitted approximately within the walls of the housing and adjustable relatively thereto, said housing having a slot adjacent to the outer side of said ring, clamping means carried by said ring and projecting outside of said housing through said slot, and means for securing said clamping means in a fixed relation relatively to said housing to hold said ring against movement therein after adjustment.

5. In a shock absorbing apparatus for vehicles, two arms, a housing carried by one arm, a cam within said housing secured to the other arm, said cam having a plurality of high parts and intermediate low parts, a plurality of springs normally resting against the low parts of said cam, a ring-like spring carrier fitted approximately within the walls of the housing and adjustable relatively thereto, said housing having a slot adjacent to the outer side of said ring, clamping means carried by said ring and projecting outside of said housing through said slot, and means for securing said clamping means in a fixed relation relatively to said housing to hold said ring against movement therein after adjustment, said clamping means including a cover plate for the slotted portion of said housing.

6. In a shock absorbing apparatus for vehicles, two arms, a housing carried by one arm, a cam within said housing secured to the other arm, said cam having a plurality of high parts and intermediate low parts, a plurality of springs normally resting against the low parts of said cam, a ring-like spring carrier fitted approximately within the walls of the housing and adjustable relatively thereto, said housing having a slot adjacent to the outer side of said ring, clamping means carried by said ring and projecting outside of said housing through said slot, and means for securing said clamping means in a fixed relation relatively to said housing to hold said ring against movement therein after adjustment, said clamping means including a cover plate for the slotted portion of said housing, one of the contracting surfaces between said cover plate and housing being roughened to aid against displacement.

7. In a shock absorbing apparatus for vehicles, two arms, a round box-like housing carried by one arm, a three-point cam centrally mounted within said housing and connected at its ends to the other arm, three springs triangularly arranged within said housing and normally resting against the low parts of said cam, a ring-like carrier fitting approximately the interior annular wall of said housing and encircling said springs, with means for holding said springs from displacement in said carrier, said ring being adjustable within said housing, and means for locking said ring against movement within said housing after adjustment.

8. In a shock absorbing apparatus for vehicles, two arms, a round box-like housing carried by one arm, a three-point cam centrally mounted within said housing and connected at its ends to the other arm, three springs triangularly arranged within said housing and normally resting against the low parts of said cam, a ring-like carrier fitting approximately the interior annular wall of said housing and encircling said springs, with means for holding said springs from displacement in said carrier, said ring being adjustable within said housing, and means for locking said ring against movement within said housing after adjustment, said means comprising a clamp carried by said ring and projecting outside of said housing for manual engagement.

9. In a shock absorbing apparatus for vehicles, two arms, a round box-like housing carried by one arm, a three-point cam centrally mounted within said housing and connected at its ends to the other arm, three springs triangularly arranged within said housing and normally resting against the low parts of said cam, a ring-like carrier fitting approximately the interior annular wall of said housing and encircling said springs, with means for holding said springs from displacement in said carrier, said ring being adjustable within said housing, and means for locking said ring against movement within said housing after adjustment, said means comprising a clamp carried by said ring and projecting outside of said housing for manual engagement, said housing having a slot in its annular wall to afford clearance for said clamp.

10. In a shock absorbing apparatus for vehicles, two arms, a round box-like housing carried by one arm, a three-point cam centrally mounted within said housing and connected at its ends to the other arm, three springs triangularly arranged within said housing and normally resting against the low parts of said cam, a ring-like carrier fitting approximately the interior annular wall of said housing and encircling said springs, with means for holding said springs from displacement in said carrier, said ring being adjustable within said housing, means for locking said ring against movement within said housing after adjustment, said means comprising a clamp carried by said ring and projecting outside of said housing for manual engagement, said housing having a slot in its annular wall to afford clearance for said clamp, and a cover plate for said slot.

11. In a shock absorbing apparatus for vehicles, two arms, a round box-like housing carried by one arm, a three-point cam centrally mounted within said housing and connected at its ends to the other arm, three springs triangularly arranged within said housing and normally resting against the low parts of said cam, a ring-like carrier fitting approximately the interior annular wall of said housing and encircling said springs, with means for holding said springs from displacement in said carrier, said ring being adjustable within said housing, and means for locking said ring against movement within said housing after adjustment, said means comprising a clamp carried by said ring and projecting outside of said housing for manual engagement, said housing having a slot in its annular wall to afford clearance for said clamp, and a cover plate for said slot, said cover plate constituting part of said clamping means.

BURTON L. LAWTON.

Witnesses:
L. T. FULLER,
G. H. DUTTON.

Copies of this patent may be obtained for five cents each, by addressing the "Commissioner of Patents, Washington, D. C."